US012608323B2

(12) United States Patent　　　(10) Patent No.:　US 12,608,323 B2
Botman et al.　　　　　　　　　　(45) Date of Patent:　Apr. 21, 2026

(54) TECHNIQUE FOR CONSTRAINING ACCESS TO MEMORY USING CAPABILITIES

(71) Applicant: Arm Limited, Cambridge (GB)

(72) Inventors: François Christopher Jacques Botman, Cambridge (GB); Thomas Christopher Grocutt, Cambridge (GB); Bradley John Smith, Edmunds (GB)

(73) Assignee: Arm Limited, Cambridge (GB)

( * ) Notice: Subject to any disclaimer, the term of this patent is extended or adjusted under 35 U.S.C. 154(b) by 173 days.

(21) Appl. No.: 18/556,477

(22) PCT Filed: Feb. 17, 2022

(86) PCT No.: PCT/GB2022/050430
§ 371 (c)(1),
(2) Date: Oct. 20, 2023

(87) PCT Pub. No.: WO2022/234243
PCT Pub. Date: Nov. 10, 2022

(65) Prior Publication Data
US 2024/0202139 A1　　Jun. 20, 2024

(30) Foreign Application Priority Data

May 4, 2021　(GB) ..................................... 2106329

(51) Int. Cl.
*G06F 12/14*　　(2006.01)
*G06F 21/60*　　(2013.01)
(52) U.S. Cl.
CPC ........ *G06F 12/1458* (2013.01); *G06F 21/604* (2013.01)
(58) Field of Classification Search
None
See application file for complete search history.

(56) References Cited

U.S. PATENT DOCUMENTS

2010/0174893 A1　7/2010　Rivera
2018/0349294 A1*　12/2018　Barnes ................ G06F 12/1441
(Continued)

FOREIGN PATENT DOCUMENTS

CN　　110622133　　12/2019
GB　　2544996 A　　6/2017
(Continued)

OTHER PUBLICATIONS

International Search Report for International Application No. PCT/GB2022/050430, dated Apr. 3, 2022.
(Continued)

*Primary Examiner* — William J. Goodchild
(74) *Attorney, Agent, or Firm* — NIXON & VANDERHYE P.C.

(57) ABSTRACT

There is provided an apparatus, method and computer program for constraining memory accesses. The apparatus comprises processing circuitry to perform operations during which access requests to memory are generated. The processing circuitry is arranged to generate memory addresses for the access requests using capabilities that identify constraining information. The apparatus further comprises capability checking circuitry to perform a capability check operation to determine whether a given access request whose memory address is generated using a given capability is permitted based on given constraining information identified by the given capability. The capability check operation includes performing a range check based on range constraining information provided by the given constraining information, and when a determined condition is met, to perform the range check in dependence on both the range constraining information and an item of state information of the apparatus which varies dynamically during performance of the operations of the processing circuitry.

18 Claims, 15 Drawing Sheets

(56) References Cited

U.S. PATENT DOCUMENTS

Figure 1:
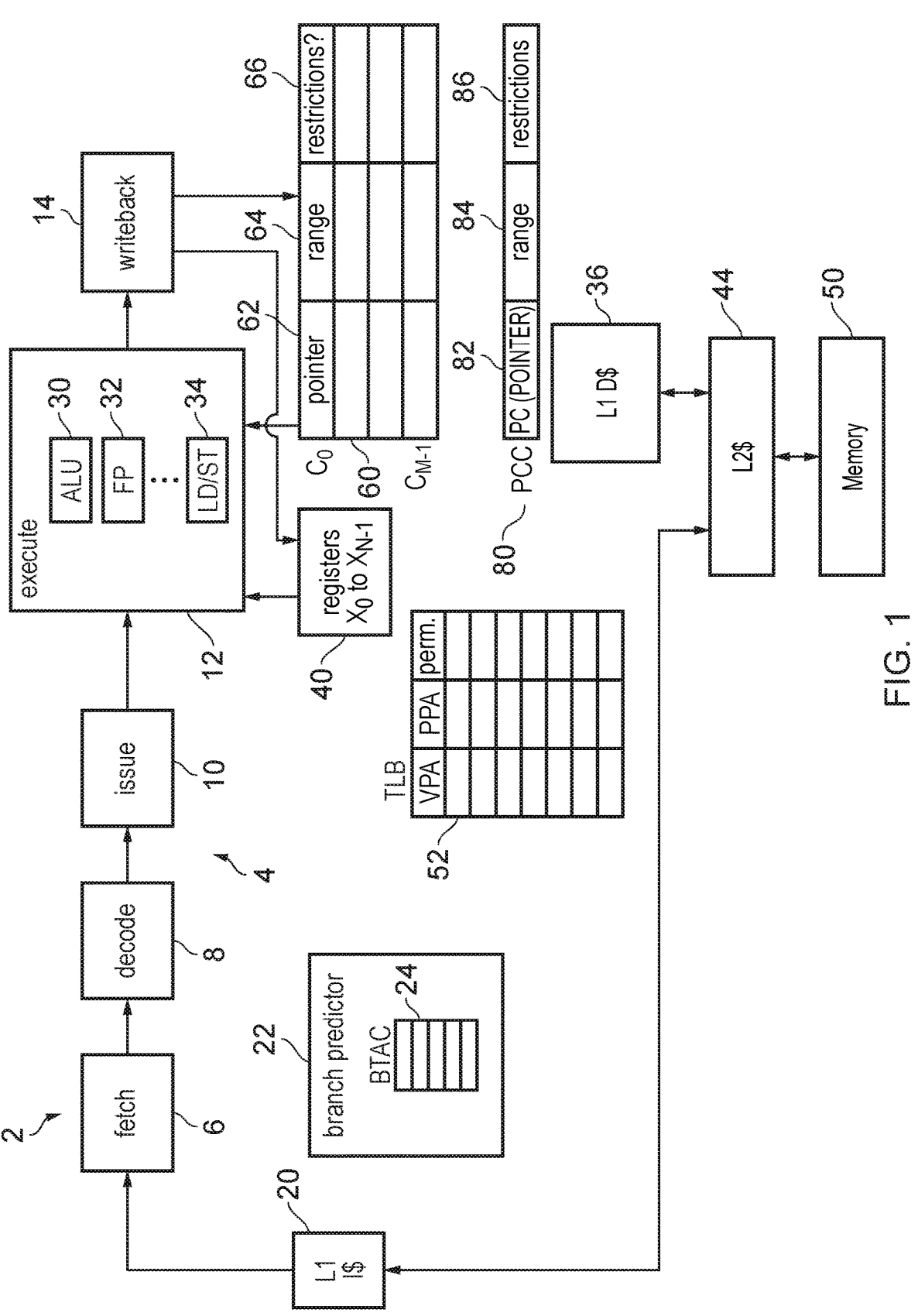

| | | | |
|---|---|---|---|
| 2019/0095356 A1 | 3/2019 | Milojicic et al. | |
| 2021/0026773 A1* | 1/2021 | Smith ..................... | G06F 21/79 |

FOREIGN PATENT DOCUMENTS

| | | |
|---|---|---|
| GB | 2562102 A | 11/2018 |
| GB | 2572151 A | 9/2019 |
| GB | 2575878 A | 1/2020 |
| JP | 2018-536238 | 12/2018 |
| JP | 2021-531583 | 11/2021 |
| TW | 201901423 | 1/2019 |
| WO | 2019/180401 | 9/2019 |

OTHER PUBLICATIONS

Combined Search and Examination Report for International Application No. PCT/GB2106329.2, dated Feb. 3, 2022.

Office Action for TW Application No. 111113611 dated Sep. 17, 2025 and English translation, 22 pages.

Robert Bedichek, "Some Efficient Architecture Simulation Techniques," Proceedings of the Winter 1990 USENIX Conference, Jan. 22-26, 1990, 13 pages.

Office Action for JP Application No. 2023-563870 issued Feb. 13, 2026 and English translation, 7 pages.

* cited by examiner

A)     SET    PR1 = 140000  ——————▶ trigger error

B)     SET    PR1 = 140000

LD    R5,    PR1    ——————▶ trigger error

Please modify each of the three memory regions such that the 1st bound and
the 2nd bound are clearly labeled (as indicated in the markup of the left hand memory region)

SIMULATOR
IMPLEMENTATION

TECHNIQUE FOR CONSTRAINING ACCESS TO MEMORY USING CAPABILITIES

The present technique relates to the field of data processing, and more particularly to the constraining of access to memory using capabilities.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer").

Capabilities can be used as a security control measure within the system, for example by enforcing that accesses to memory performed with reference to a capability can only be performed in respect of memory locations within a defined region determined from the capability, and only if certain permission checks also defined by the capability are met.

Whilst the aforementioned mechanism provides a limit on the memory region that can be accessed by a capability, the bounds that are enforced are statically defined within the referenced capability. As a result, once a capability has been defined, memory accesses can be performed with reference to the defined capability as long as the capability exists. This mechanism therefore does not provide for situations in which regions of memory vary dynamically, for example, based on a state of processing circuitry that makes reference to the capabilities.

In some example configurations there is provided an apparatus comprising: processing circuitry to perform operations during which access requests to memory are generated, wherein the processing circuitry is arranged to generate memory addresses for the access requests using capabilities that identify constraining information; and capability checking circuitry to perform a capability check operation to determine whether a given access request whose memory address is generated using a given capability is permitted based on given constraining information identified by the given capability, the capability check operation including performing a range check based on range constraining information provided by the given constraining information; wherein the capability checking circuitry is further configured, when a determined condition is met, to perform the range check in dependence on both the range constraining information and an item of state information of the apparatus which varies dynamically during performance of the operations of the processing circuitry.

In other example configurations there is provided a method comprising: employing processing circuitry to generate, during operations, memory addresses for access requests to memory using capabilities that identify constraining information; employing capability checking circuitry to perform a capability check operation to determine whether a given access request whose memory address is generated using a given capability is permitted based on given constraining information identified by the given capability, the capability check operation including performing a range check based on range constraining information provided by the given constraining information; and when a determined condition is met, arranging the capability checking circuitry to perform the range check in dependence on both the range constraining information and an item of state information of the apparatus which varies dynamically during performance of the operations of the processing circuitry.

In other example configurations there is provided a computer program for controlling a host data processing apparatus to provide an instruction execution environment, comprising: processing program logic to perform operations during which access requests to memory are generated, wherein the processing program logic is arranged to generate memory addresses for the access requests using capabilities that identify constraining information; and capability checking program logic to perform a capability check operation to determine whether a given access request whose memory address is generated using a given capability is permitted based on given constraining information identified by the given capability, the capability check operation including performing a range check based on range constraining information provided by the given constraining information; wherein the capability checking program logic is further configured, when a determined condition is met, to perform the range check in dependence on both the range constraining information and an item of state information of the apparatus which varies dynamically during performance of the operations of the processing program logic.

Figure 2:
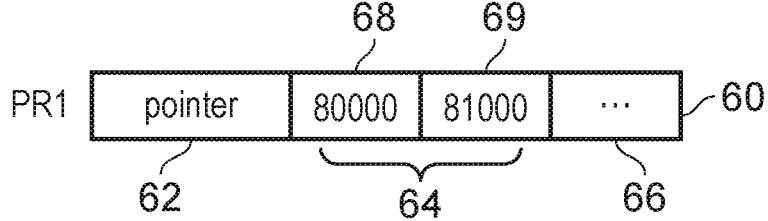
Figure 3:
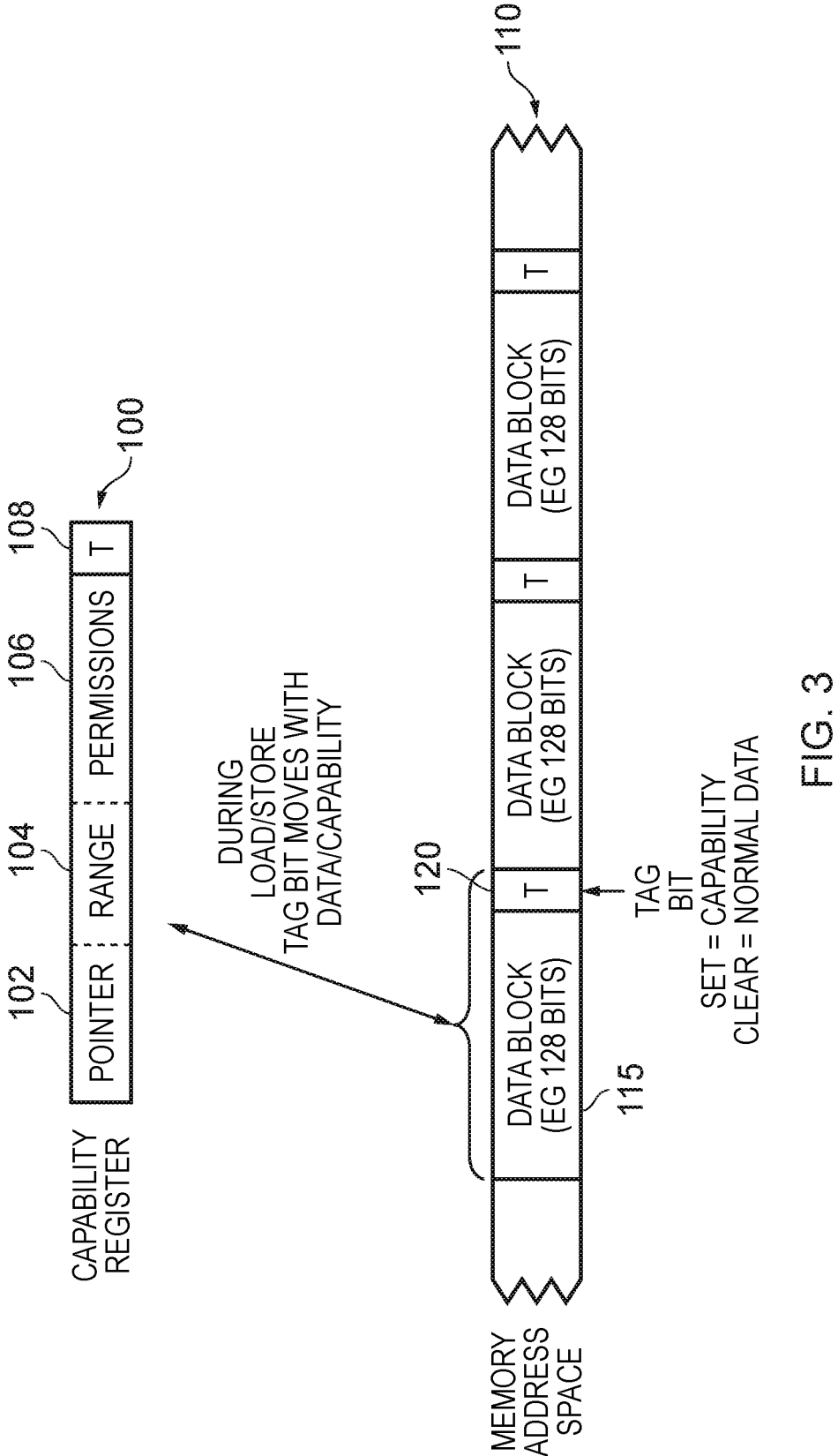
Figure 4:
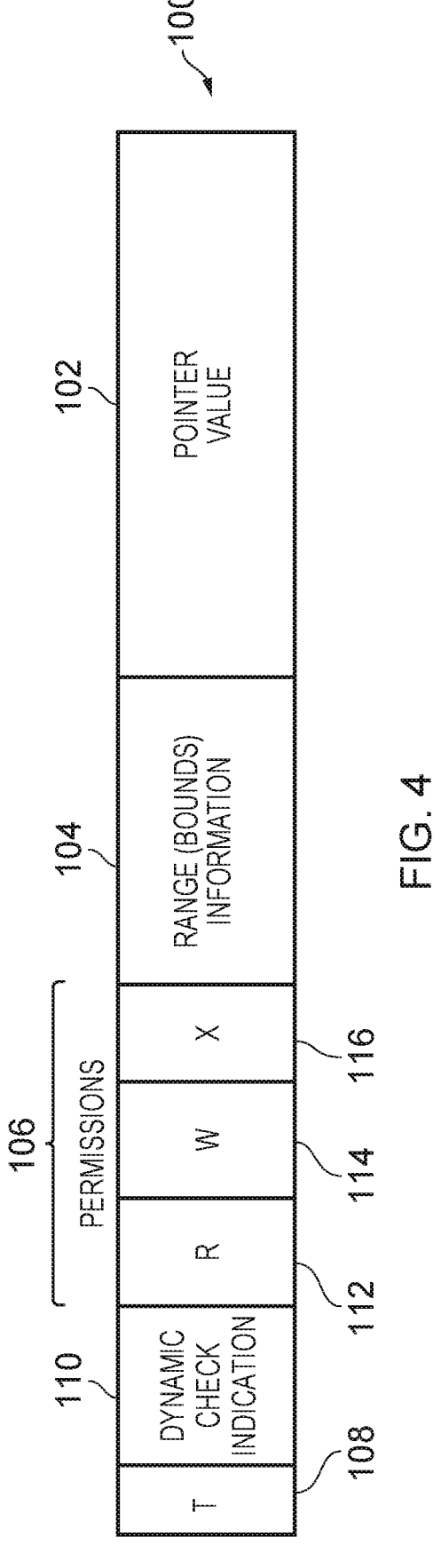
Figure 5A:
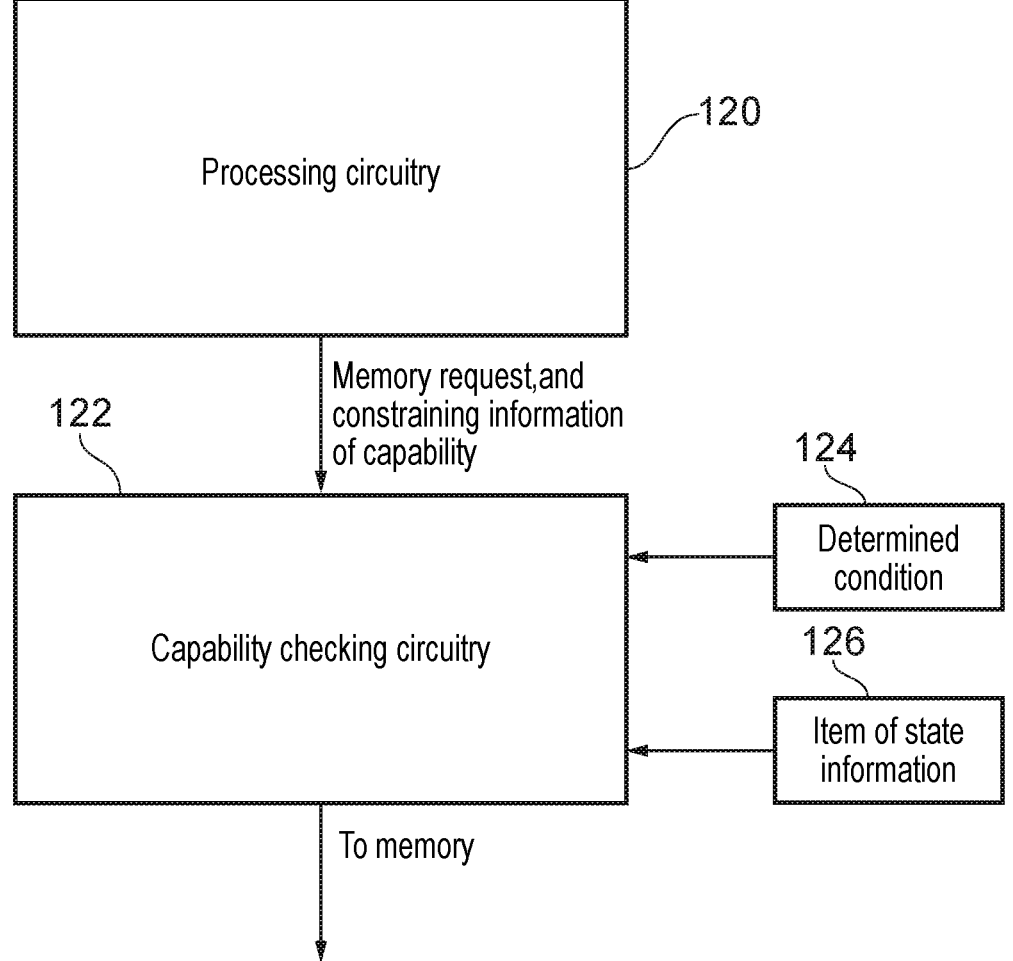
Figure 5B:
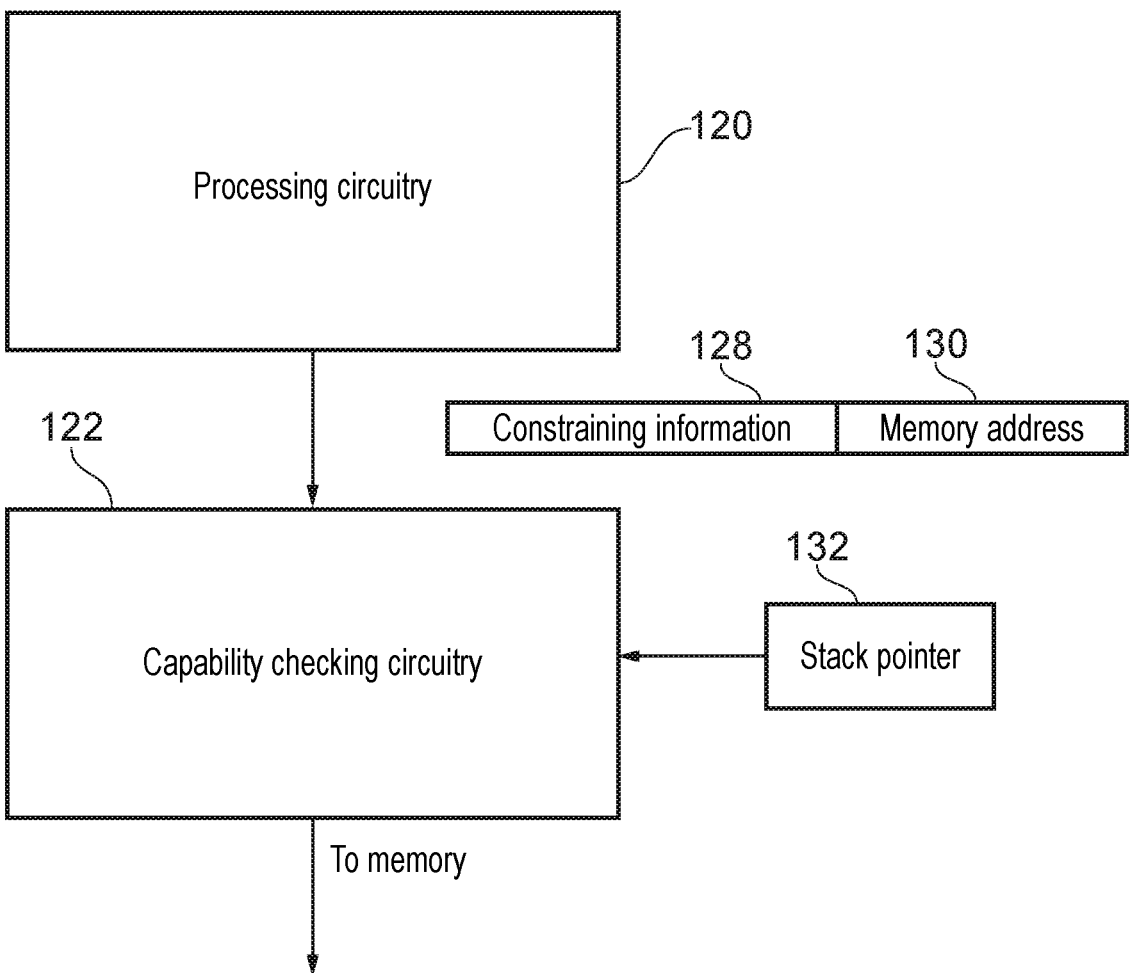
Figure 5C:
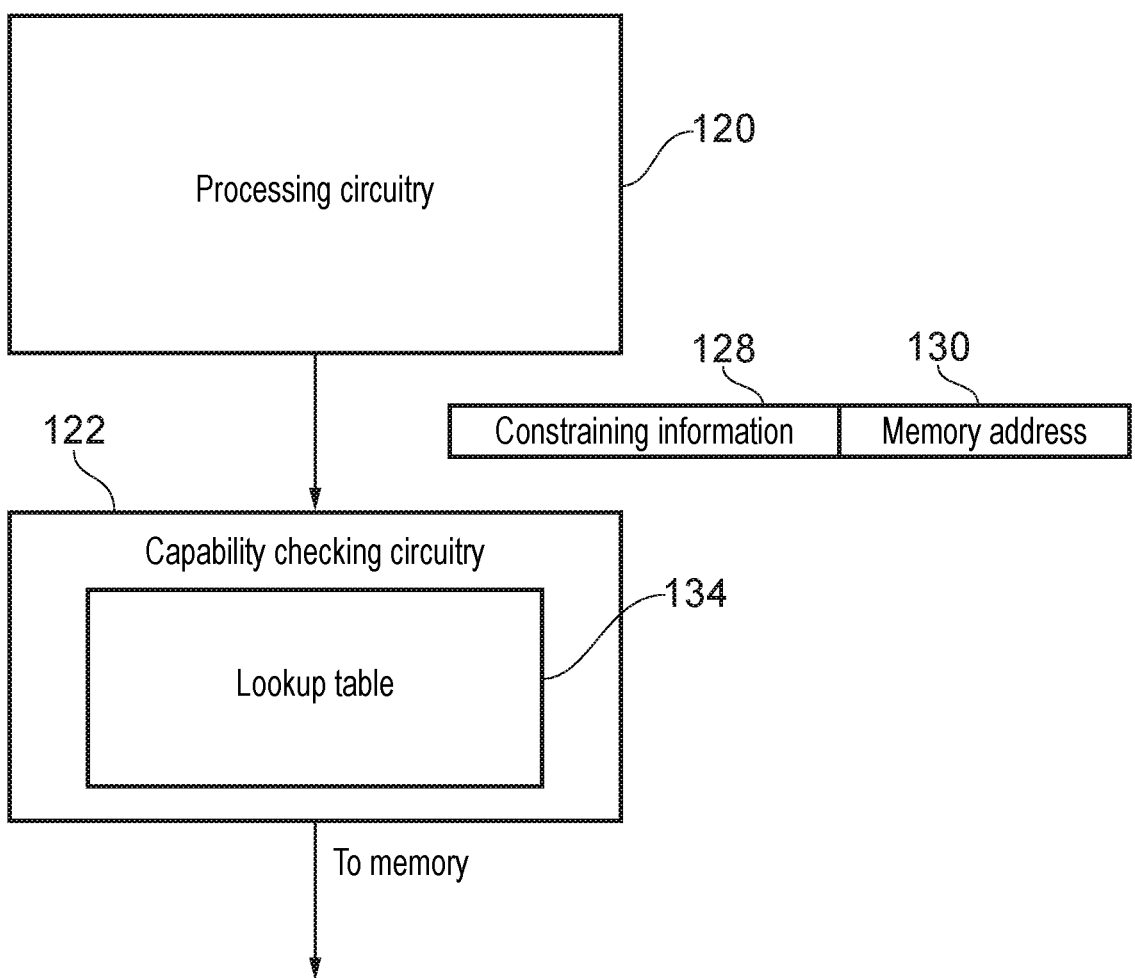
Figure 5D:
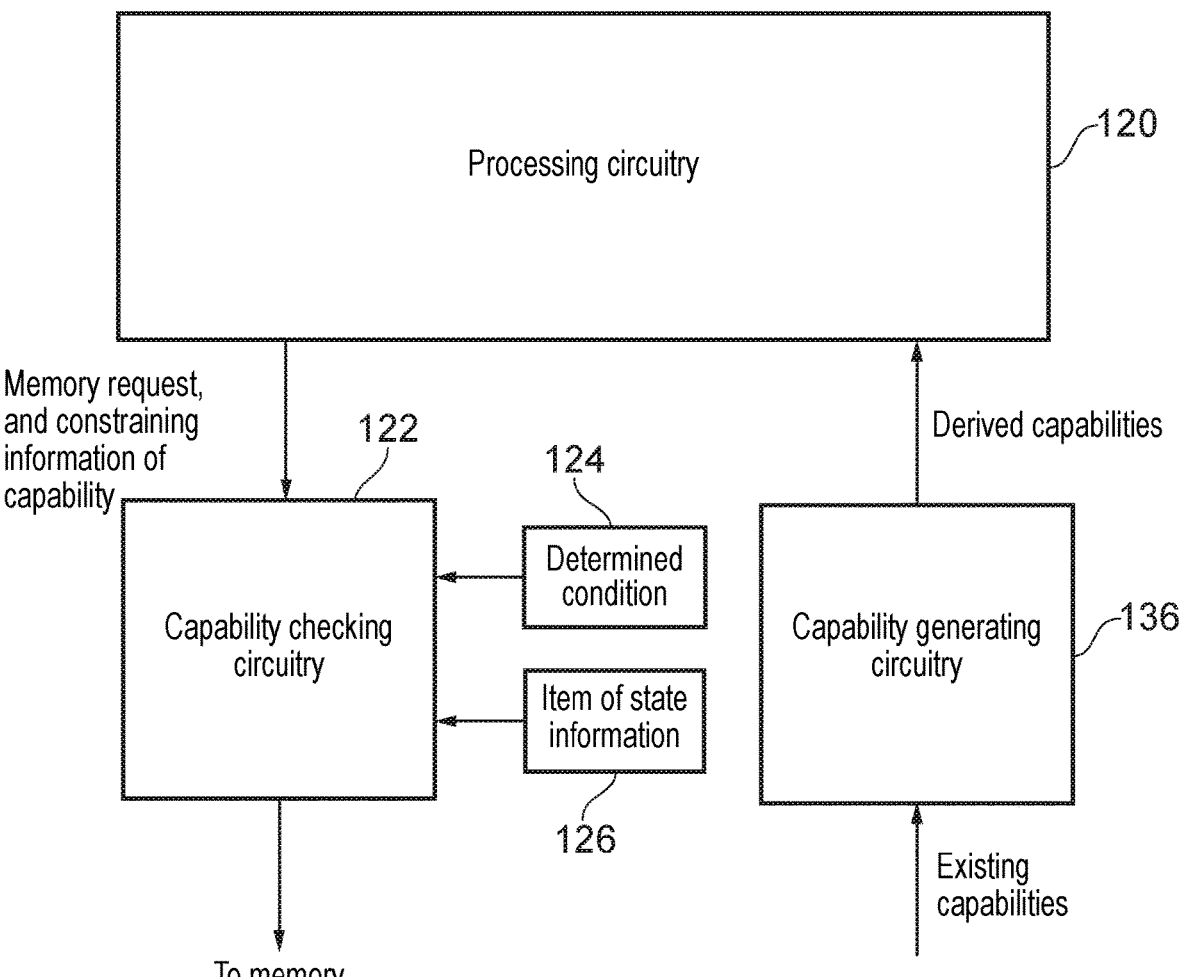
Figure 6:
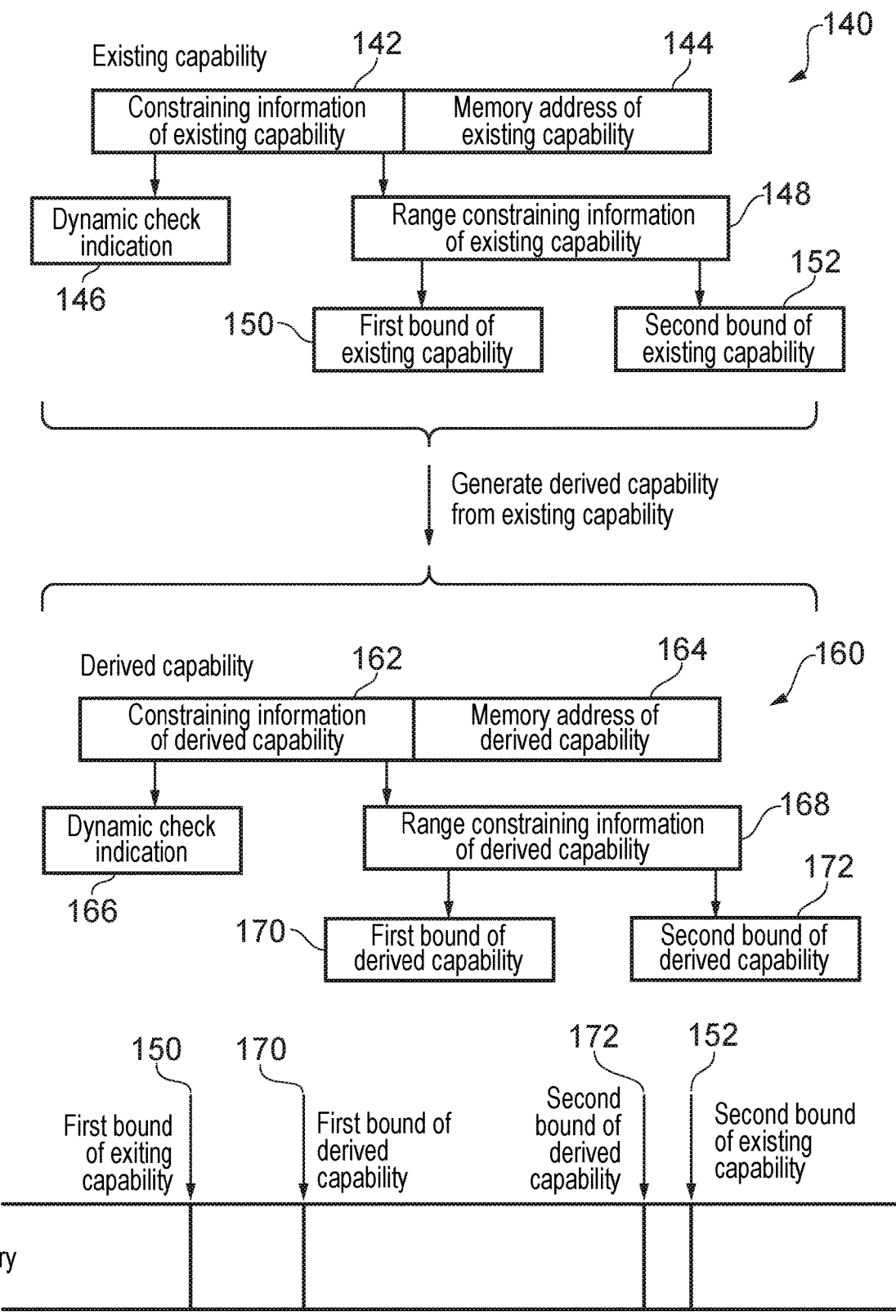
Figure 7:
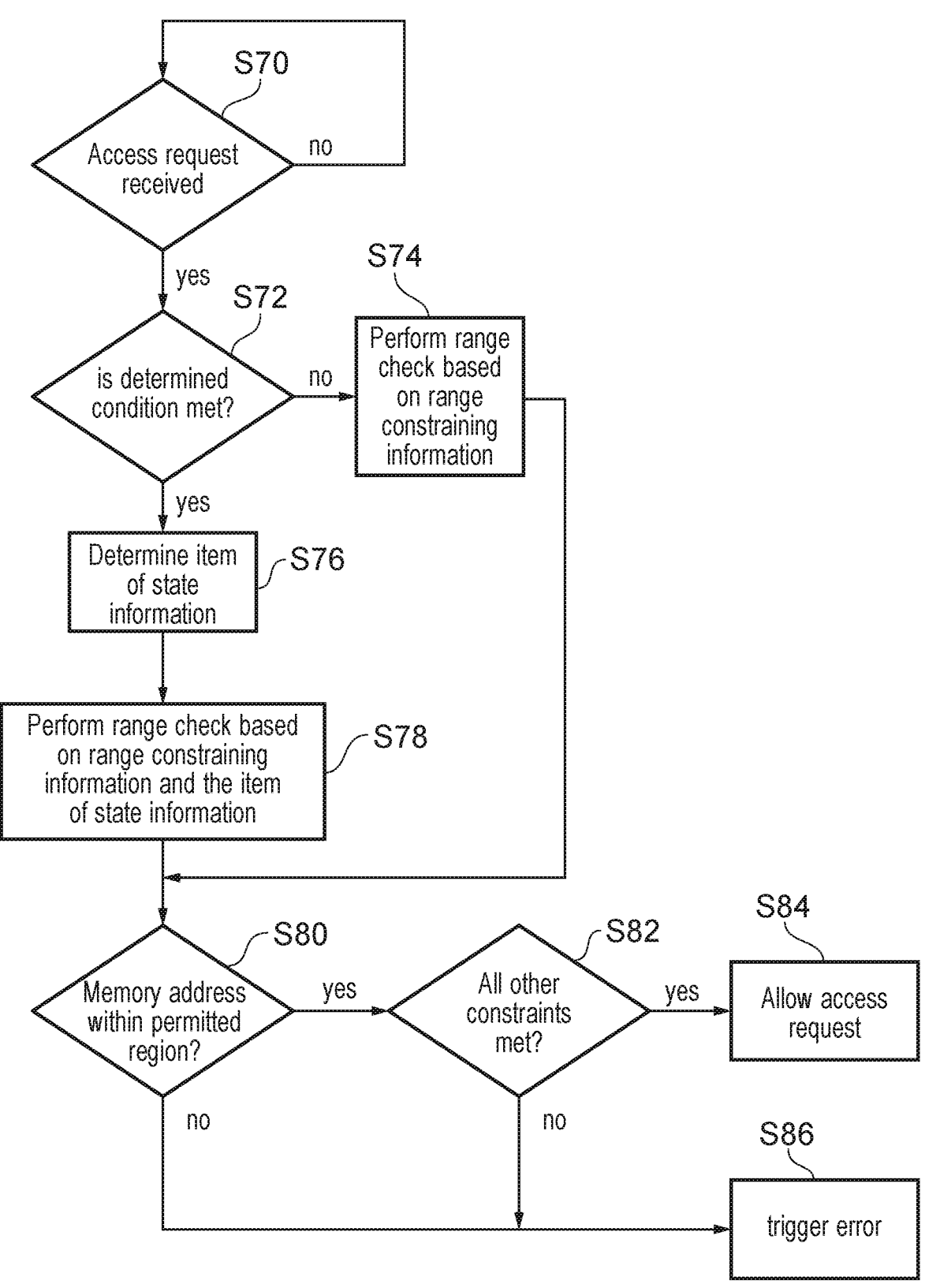
Figure 8:
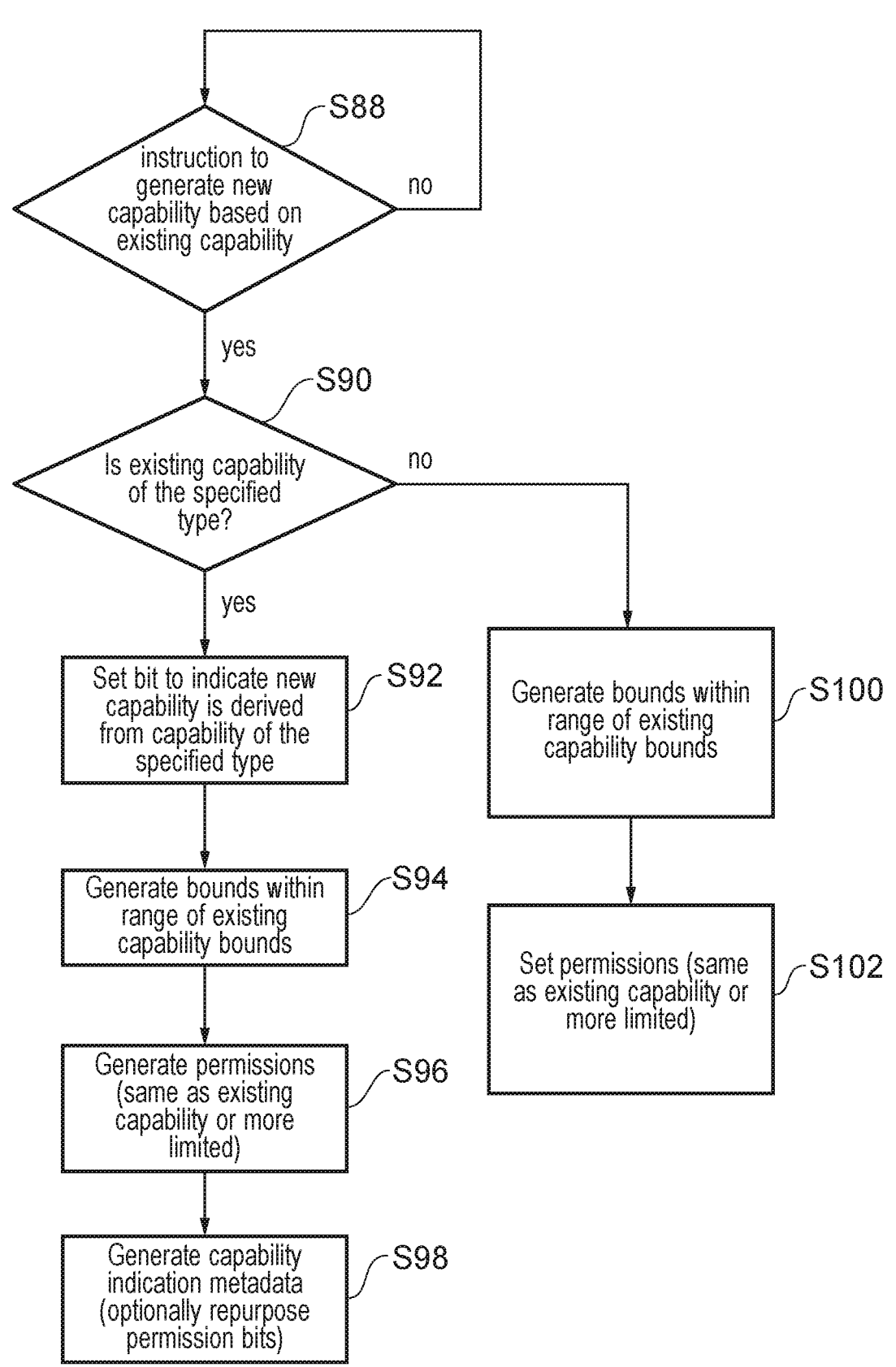
Figure 9:
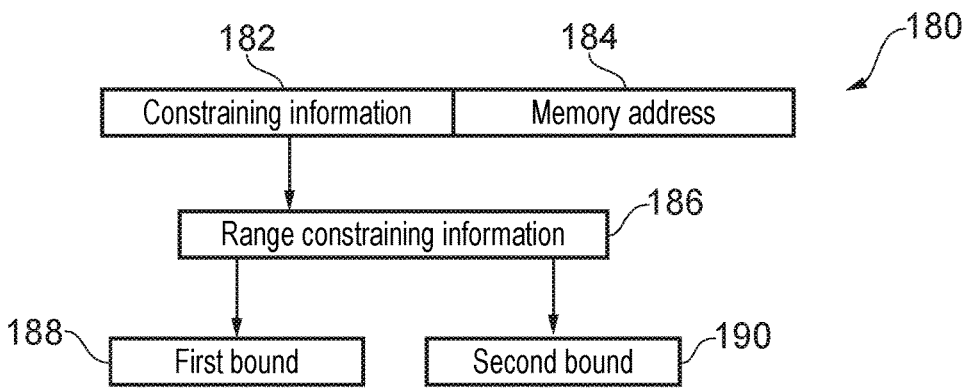
Figure 9:
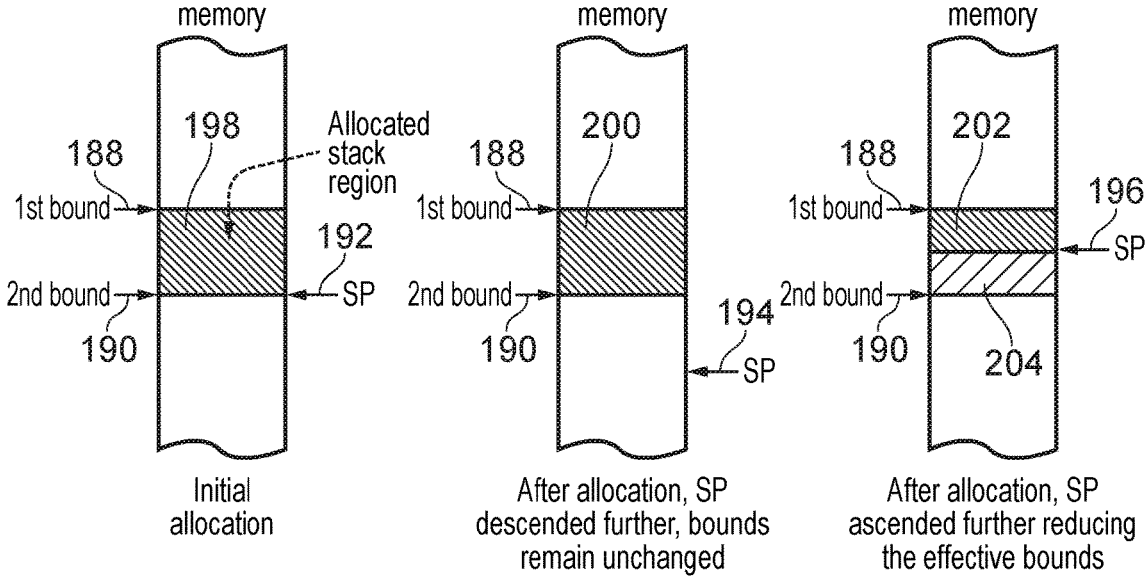
Figure 10:
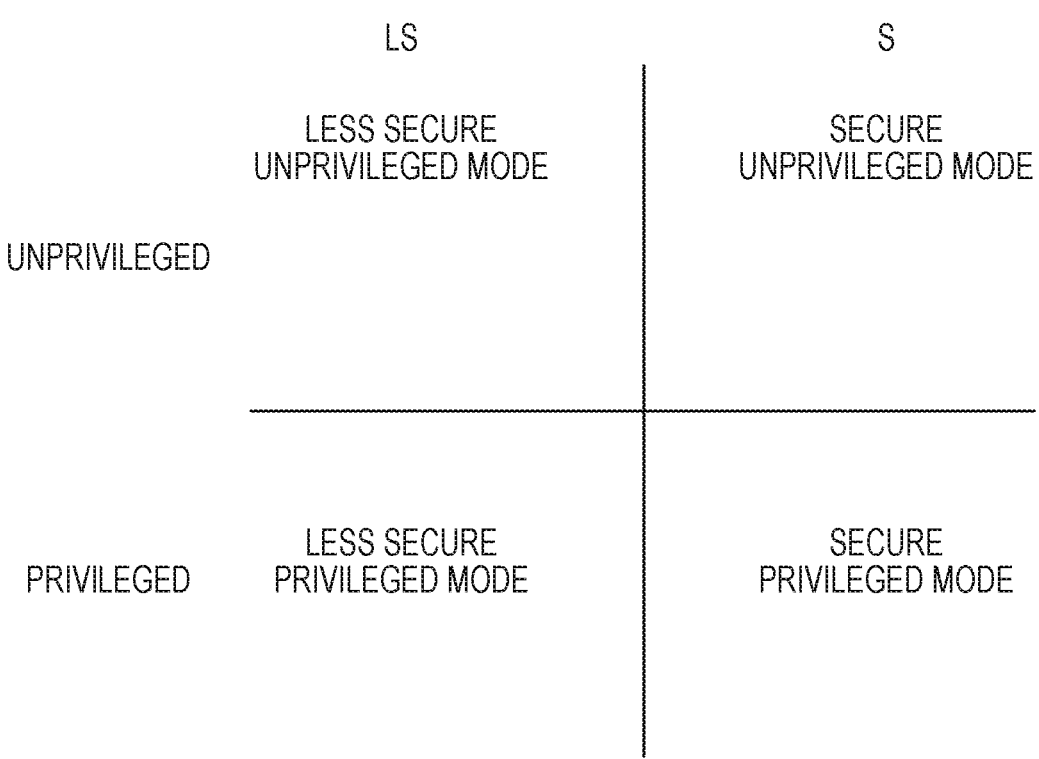
Figure 11:
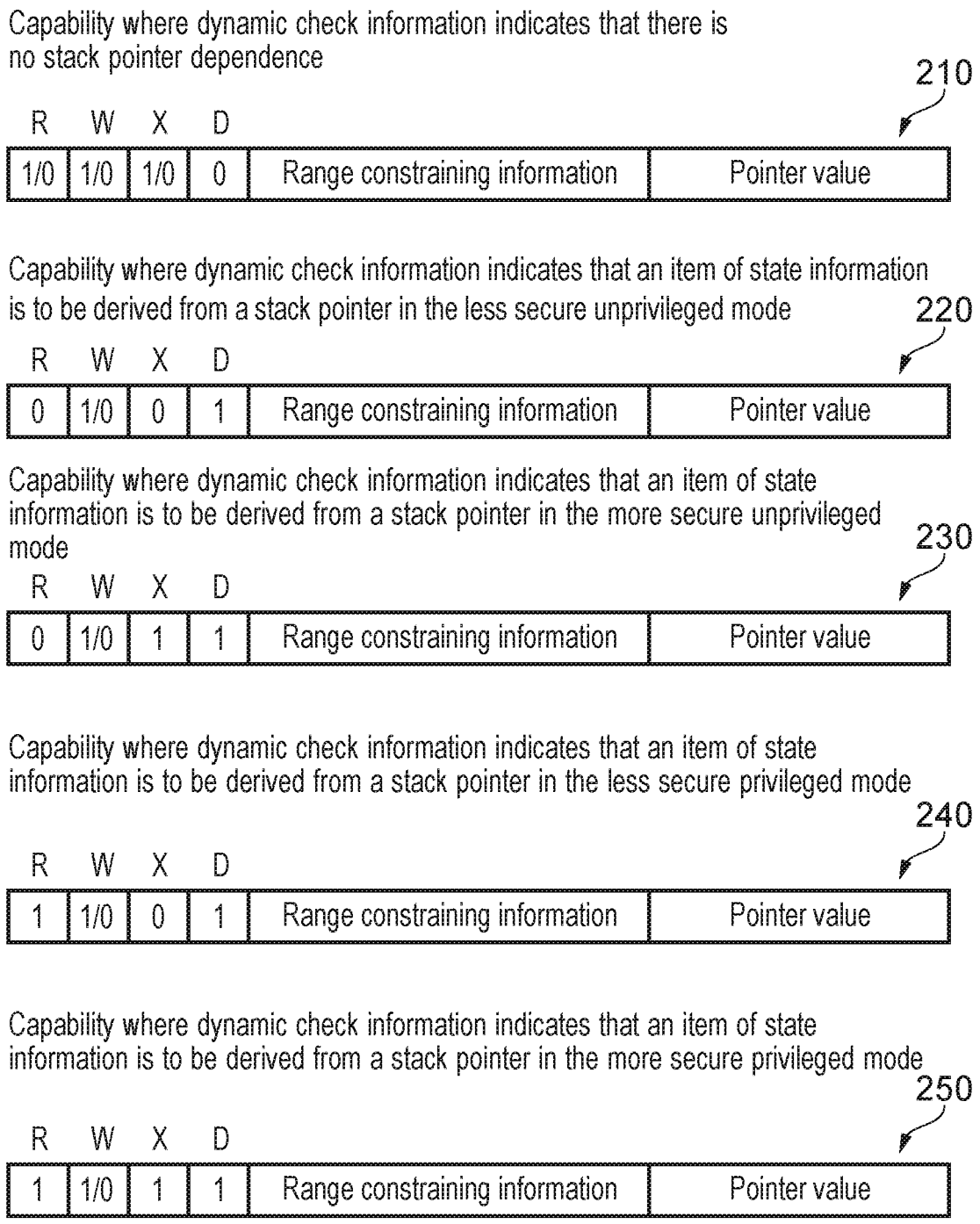
Figure 12:
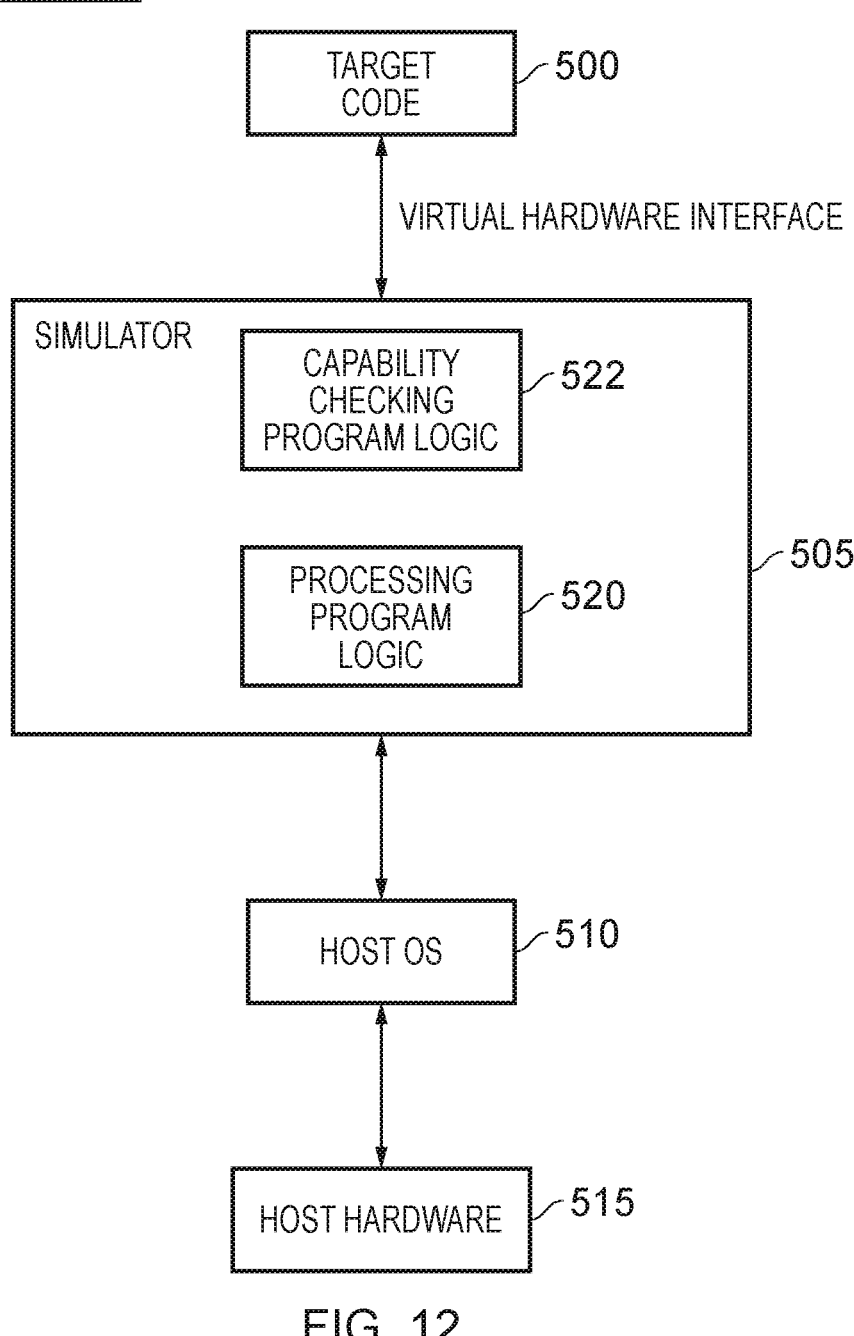

The present techniques will be described further, by way of example only, with reference to example implementations thereof as illustrated in the accompanying drawings, in which:

FIG. 1 schematically illustrates a block diagram of an apparatus in accordance with some example configurations;

FIG. 2 shows examples of types of instruction for which an error may be triggered if there is an attempt to set or access a pointer value within a set of bounded pointer storage elements, where that pointer value is used to specify an address outside the range indicated by the associated range information;

FIG. 3 schematically illustrates the use of a tag bit in association with bounded pointers, in accordance with some example configurations;

FIG. 4 schematically illustrates the form of a capability in accordance with some example configurations;

FIG. 5a schematically illustrates details of an apparatus comprising capability checking circuitry in accordance with some example configurations;

FIG. 5b schematically illustrates details of an apparatus comprising capability checking circuitry in accordance with some example configurations;

FIG. 5c schematically illustrates details of an apparatus comprising capability checking circuitry in accordance with some example configurations;

FIG. 5d schematically illustrates details of an apparatus comprising capability checking circuitry and capability generating circuitry in accordance with some example configurations;

FIG. 6 schematically illustrates the derivation of a capability from an existing capability according to some example configurations;

FIG. 7 schematically illustrates a sequence of steps performed by capability checking circuitry in response to a memory access request in accordance with some example configurations;

FIG. 8 schematically illustrates a sequence of steps performed by capability generating circuitry in response to an instruction to generate a new capability based on an existing capability in accordance with some example configurations;

FIG. 9 schematically illustrates an accessible region of memory defined based on a capability and a stack pointer in accordance with some example configurations;

FIG. 10 schematically illustrates operating modes of an apparatus in accordance with some example configurations;

FIG. 11 schematically illustrates a form of encoding of the relevant operating mode of an apparatus from which to determine an item of state information for reference during a range check procedure, using repurposed permission bits of capabilities; and FIG. 12 schematically illustrates a simulator that can be used in accordance with some example configurations.

In accordance with some example configurations there is provided an apparatus having processing circuitry to perform operations during which access requests to memory are generated. The processing circuitry is arranged to generate memory addresses for the access requests using capabilities that identify constraining information. Furthermore, the apparatus is provided with capability checking circuitry to perform a capability check operation to determine whether a given access request whose memory address is generated using a given capability is permitted based on given constraining information identified by the given capability. The capability check operation includes performing a range check based on range constraining information provided by the given constraining information. The capability checking circuitry is further configured, when a determined condition is met, to perform the range check in dependence on both the range constraining information and an item of state information of the apparatus which varies dynamically during performance of the operations of the processing circuitry.

The capabilities can take a variety of forms, but one type of capability is a bounded pointer (which may also be referred to as a "fat pointer"), which comprises a pointer value indicative of a memory address and range constraining information that is encoded within the capability. The range constraining information identified in each capability is provided to constrain the region of memory that is accessible to memory requests generated using (derived from) that capability. The range constraining information is checked by the capability checking circuitry when a memory request is generated using that capability to ensure that the access is within a permitted region. The capability checking circuitry can be a separate component to the processing circuitry, or alternatively may be provided within the processing circuitry of the apparatus.

The inventors have realised that this approach does not take into account the dynamic way in which memory is allocated based on processing activities performed by the processing circuitry. For example, an area to which it may be desirable to permit access at the time when a capability is generated could be repurposed or reduced in size subsequent to the generation of the capability. In such a situation the range constraining information of the capability may continue to permit access to a memory area for which it may be now, subsequent to the repurposing of the memory area, desirable to restrict accesses. Hence, a capability check operation is provided that, in addition to ensuring that the memory request falls within a region permitted by the range constraining information defined in the capability, performs a range check using an item of state information of the apparatus. In particular, the item of state information is dependent on the operations of the processing circuitry and may vary dynamically during the performance of those operations. It is not always necessary to carry out the range check operation dependent on both the item of state information and the range constraining information and legacy code running on an apparatus with this facility may not require or make use of such facilities. Hence, the capability checking circuitry is configured to perform the range check operation dependent on both the item of state information and the range constraining information when a determined condition is met.

The capability checking circuitry is also configured, when the determined condition is not met, to perform the range check operation dependent on the range constraining information and independent of the item of state information. In this way the capability checking circuitry is able to perform both the static range check for capabilities whose accessible region does not vary dynamically (determined condition not met), and the capability checking circuitry can perform the dynamic range check for capabilities whose accessible region varies dynamically based on the item of state information. In this way the range check is extended to account for dynamic variation in memory usage or dynamic variation in a processing state of the processing circuitry.

The item of state information can take a variety of forms. However, in some example configurations the item of state information is a pointer value that points to a location within a region of memory. The pointer acts to define a dynamically varying accessible region for capabilities for which the determined condition is met, in addition to the range constraining information within the capability. In this way a size of a memory region that is accessible based on the capabilities for which the determined condition is met can be varied dynamically through modification of the pointer value.

Whilst the item of state information can be any pointer value, in some example configurations the pointer value is a stack pointer value and the region of memory is configured to be used as a stack. The stack pointer defines a bound on the region of memory that is configured to be used as a stack and varies dynamically during program execution. The region of memory may be further bound by a static base pointer or otherwise known base address. As further memory is required by the processing circuitry, for example during a function call, the stack pointer is modified such that the region of memory that is configured to be used as a stack is increased. When the further memory is no longer required by the processing circuitry, for example after a function return, the stack pointer is modified such that the region of memory configured to be used as a stack is decreased. Hence, the stack pointer provides a dynamically varying bound on a region of memory that is accessible during operations of the processing circuitry. Previously, accesses to memory using capabilities would be constrained by the range constraining information within the capability. As such, when the capability is configured to constrain access to a memory region configured to be used as a stack (or a sub-region thereof), accesses made based on that capability are able to access that region independent of the stack pointer. As a result erroneous accesses could be generated from the capability once the stack pointer has been modified to decrease the region of memory configured as a stack, for example where a portion of the region of accessible memory defined in the capability no longer forms part of the stack. By providing capability checking circuitry that, when the determined condition is met, further constrains accesses generated from capabilities by the stack pointer value, the apparatus can prevent such erroneous accesses.

The range check performed by the capability checking circuitry can be defined in a variety of ways. In some example configurations the capability checking circuitry is further configured, when the determined condition is met, to perform the range check based on a first bound derived from the range constraining information and a second bound derived from whichever of the range constraining information and the pointer value results in the second bound being more restrictive. The range constraining information is encoded in the constraining information of the capability and acts to restrict the range of memory addresses that are accessible to memory accesses derived from the capability. When the determined condition is not met, the range capability checking circuitry is configured to perform the range check to restrict accesses that do not fall within the range of a first bound and a second bound which are derived from the range constraining information in the capability. However, when the determined condition is met, the second bound is derived based on a more restrictive of the pointer value and the bound derived from the range constraining information. The more restrictive bound is the bound derived from whichever of the pointer value and the range constraining information permits access to a smallest range of memory addresses.

In some example configurations the capability checking circuitry is further configured to permit the memory access when the memory address is within an allowable region of memory bounded between the first bound and the second bound. In such example configurations the more restrictive bound is the bound that results in a smallest range of addresses between the first bound and the second bound. In some example configurations the first bound is a lower bound and the second bound is an upper bound; the capability checking circuitry is configured, when the upper bound is greater than the lower bound, to permit memory accesses in the memory region between the lower bound and the upper bound; and the capability checking circuitry is configured, when the upper bound is less than the lower bound, to restrict all accesses generated based on the capability.

For configurations in which the pointer value is a stack pointer value, the capability checking circuitry is configured, when the determined condition is met, to further restrict access based on the stack pointer value. In some example configurations the stack is defined with a fixed lower bound and a dynamically varying upper bound defined based on the stack pointer. It would however be readily apparent to the person skilled in the art that the stack could equally be defined with a fixed upper bound and a dynamically varying lower bound based on the stack pointer value. For a capability comprising range constraining information that is defined based on a region initially within the stack there are three possible cases. In the first case the range constraining information defines a region which falls within the region of memory configured to be used as a stack. In this case the capability checking circuitry is configured to permit access to memory requests derived from the capability that specify the region defined by the first bound and the second bound derived based on the range constraining information. In the second case the range constraining information defines a region which falls outside of the region of memory configured to be used as a stack. In this case the capability checking circuitry is configured to deny access to all memory requests derived from the capability. In the third case the range constraining information defines a region for which the lower bound falls within the region of memory configured to be used as a stack and the upper bound falls outside the region of memory configured to be used as a stack. In this case the capability checking circuitry is configured to permit access to a region of memory between the lower bound and an upper bound that is derived based on the stack pointer value.

There are a number of ways in which the capability checking circuitry can be configured to determine that the determined condition is met. For example, the capability checking circuit can determine that the determined condition is met based on a stored value or a state of the processing circuitry. In some example configurations the capability checking circuitry is configured to determine that the determined condition is met when the given capability is of a determined type.

The capability can be identified as a capability of the determined type in a variety of ways, for example based on the identification that the given capability corresponds to a particular subset of memory. In some example configurations the given constraining information of the given capability comprises dynamic check indication metadata to indicate whether the given capability is of the determined type.

The dynamic check indication metadata can be encoded within the given capability using any of the bits of the capability. In some example configurations the dynamic check indication metadata comprises a dedicated metadata field within the given capability. For example, the dynamic check indication metadata could comprise a single bit that takes a first value when the given capability is of the determined type and that takes a second value when the given capability is not of the determined type.

In some example configurations the given capability is of the determined type when the given capability references a further capability of a specified type. The given capability could directly reference the further capability of the specified type, or alternatively the given capability could indirectly reference the capability of the specified type, for example, by referencing another capability, which itself references the further capability of the specified type. In some example configurations capabilities of the specified type are also of the determined type (and hence have their range constraints determined in the dynamic manner discussed earlier). In some example configurations the capabilities of the specified type comprise pointer values that vary dynamically based on the operations of the processing circuitry.

For some example configurations in which the given capability references a further capability of a specified type, the given constraining information is arranged to provide capability indication metadata to identify the further capability, and the further capability is arranged to provide an associated pointer value and associated constraining information, with the associated pointer value forming the item of state information. Memory accesses generated based on the associated pointer value of the further capability are therefore constrained by the associated constraining information. The given capability provides capability indication metadata that identifies (indicates) the further capability such that memory accesses generated based on the given capability are further constrained by the associated pointer value.

The capability indication metadata may be variously provided and can be tailored to depend on the specified type of capability. In some example configurations the further capability is a stack pointer capability; the processing circuitry has multiple operating modes each having a corresponding associated stack in memory with a corresponding stack pointer capability; and the capability indication metadata is arranged to provide stack pointer indication metadata to identify which corresponding stack pointer capability forms the item of state information. In such configurations the specified type is a stack pointer capability. The operating modes of the processor are not limited but in some example configurations the modes can be categorised as one of a more secure mode and a less secure mode, and/or one of a privileged and an unprivileged mode. As a result there are four distinct operating modes of the processor (more secure unprivileged, more secure privileged, less secure unprivileged, and less secure privileged). Capabilities of the determined type each reference one of the stack pointer capabilities associated with one of the processor modes. For example, the given capability could be of the determined type and could access the stack pointer capability associated with the more secure privileged mode, the more secure unprivileged mode, the less secure privileged mode, or the less secure unprivileged mode. As a result, the given capability will be constrained by the stack pointer value associated with the processor mode identified by the given capability rather than the stack pointer value normally associated with the currently active processor mode.

The capability checking circuitry may be configured, when the processor is operating in a first mode, and a request to generate a memory address arises that is based on a capability of the determined type that makes reference to a stack pointer in a second mode, to allow the access (subject to the access falling within the bounds derived from the range constraining information and the associated stack pointer value and any further associated permissions checks) based on the associated stack pointer value when the first mode and the second mode are a same mode; and to deny the access (independent of the range constraining information) based on the associated stack pointer value when the first mode and the second mode are different modes. In this way the processing circuitry is able to prevent capabilities, which have been defined using a stack pointer in the second mode, from erroneously being able to access memory regions when the processing circuitry is operating in the first mode that is different from the second mode.

The capability indication metadata can be encoded using any of the fields within the capability. In some example configurations the constraining information of each capability comprises a first subset of permission bits and a second subset of permission bits; and when the given capability is of the determined type, the first subset of permission bits are repurposed to provide the capability indication metadata. Typically, permission bits encode the type of memory accesses (read, write and/or execute) that are permitted for a given capability. In some example configurations three permission bits are provided indicative of whether read accesses are permitted or not, write accesses are permitted or not, and execute accesses are permitted or not. By repurposing a first subset of the permission bits when the determined condition is met, the capability indication metadata can be encoded as one of $2^N$ values where N is the number of permission bits included in the first subset. The first subset can comprise any number of the permission bits including all the permission bits. In example configurations for which capabilities of the specified type are stack pointer capabilities associated with one of four processing modes, the processing mode may for example be encoded using two of the three permission bits.

For example configurations in which the permission bits are repurposed for the capability indication metadata, the capability checking circuitry is configured, when the given capability is of the determined type, to determine permissions of the given capability from the second subset of permission bits and a set of inferred first permission bits. In example configurations where the first subset comprises two of the permission bits, the permissions of the given capability are determined based on the remaining permission bit (the permission bit in the second subset of permission bits) and the inferred permission bits.

The inferred permission bits can be determined in various ways. In some example configurations the set of inferred first permission bits are determined by values of equivalent permission bits provided by the further capability of the specified type. Alternatively, the inferred permission bits can be determined based on default permission bits that are associated with the types of accesses known to be performed by capabilities of the determined type.

In some example configurations the first subset of permission bits comprises a read permission bit indicating whether a given pointer value provided by the given capability is allowed to be used to generate a memory address for a data item to be read, and an execute permission bit indicating whether the given pointer value provided by the given capability is allowed to be used to generate a memory address for an instruction to be fetched for execution by the processing circuitry. For example configurations in which the given capability references a stack pointer capability the first subset of permission bits are inferred as readable and non-executable accesses. Typically data on the stack should be readable such that it can be accessed by processing operations of the processing circuitry and should be non-executable to avoid security vulnerabilities. The write permission bit is included in the second subset of permission bits and is determined from the given capability. Hence, by repurposing the read and execute permission bits to identify (indicate) the stack pointer from the four stack pointers that are each associated with a processing mode, an efficient encoding can be achieved without the need for additional bits to be added to the capability.

In some example configurations the constraining information of the further capability of the specified type comprises dynamic check indication metadata set to indicate that that further capability is of the determined type; the apparatus further comprises capability generation circuitry to generate derived capabilities from existing capabilities; and the capability generation circuitry is arranged, when a derived capability is generated from the further capability, to cause the dynamic check indication metadata for that derived capability to be inherited from the further capability. The capability generating circuitry can be a separate component to the processing circuitry, or alternatively may be provided within the processing circuitry of the apparatus. The dynamic check indication metadata can for example be inherited by setting the dynamic check indication metadata in the derived capability to a same value as dynamic check indication metadata in the existing capability. For some example configurations, when the further capability comprises capability indication metadata, the derived capability inherits the capability indication metadata from the further capability. In this way, when the further capability is of the determined type, the derived capability is also of the determined type and is constrained by the same item of state information as the further capability.

In some example configurations the apparatus further comprises capability generation circuitry to generate derived capabilities from existing capabilities; and the capability generation circuitry is arranged, when a derived capability is generated, to cause that derived capability to have dynamic check indication metadata set in dependence on whether that derived capability is derived from the further capability of the specified type. Hence, all capabilities that are derived based on the further capability of the specified type are generated with dynamic check indication metadata indicating that the derived capability is of the determined type. Furthermore, for example configurations in which the further capability is one of a plurality of possible capabilities of the specified type, the capability generating circuitry may be configured to set capability indication metadata indicating which capability of the specified type the derived capability is generated from.

As discussed, in some example configurations the item of state information is defined in the given capability or is inferred from the determined condition based on the given capability. In some alternative example configurations the capability checking circuitry is configured to, when the determined condition is met, perform a lookup, based on the given constraining information, in a lookup table associating a subset of capabilities with metadata and, when the lookup hits in the lookup table, to determine the item of state information based on the metadata. The lookup table may be stored in a known location either in memory (based on an address that is hard coded or stored in a register) or in dedicated storage provided as part of the capability checking circuitry, the processing circuitry or as an external entity. In response to the determination that the determined condition is met, the capability checking circuitry performs a lookup in the lookup table. When the lookup hits in the lookup table the item of state information is determined based on the metadata. The metadata could indicate a register, storage location, or further capability in which the item of state information is indicated. Alternatively, the metadata could be the item of state information or could encode information from which the item of state information is derived.

The lookup table can be indexed in a variety of ways. In some example configurations, the lookup table could be indexed based on a portion of the given pointer value in the given capability. Alternatively, in some example configurations the capability checking circuitry is further configured to perform the lookup using indexing information identified in the given constraining information. For example, the given constraining information could comprise permission bits which are repurposed to index the lookup table.

As discussed, in some example configurations where the permission bits are repurposed, the permissions of the given capability can be inferred or determined based on a further capability referenced by the given capability. In some example configurations, when a lookup table is used to associate the given capability with metadata, the metadata further comprises permission metadata indicative of permissions of the given capability. In some example configurations, the lookup table could be indexed using a repurposed subset of bits from the range constraining information thereby enabling a larger number of independent entries in the lookup table and greater flexibility in further constraining the given capability in response to dynamically varying items of state information.

In some example configurations, when the capability indication metadata is identified in the first subset of permission bits, the processing circuitry may be arranged, when seeking to execute a capability modification instruction in respect of the given capability, to prevent modification of the capability indication metadata as identified in the first subset of permission bits. Typically, modification of the permission bits of a capability is only permitted when the modified permissions are more restrictive than the unmodified permissions. However, when the permission bits have been repurposed to provide capability indication metadata, the modification of the permission bits presents a potential security vulnerability as the given capability could potentially be modified to indicate a different further capability resulting in a previously restricted area of memory being accessible. Hence, when the determined condition is met, the processing circuitry can prevent the use of permission modifying instructions by preventing the repurposed bits from being changed, clearing a tag bit such that the given capability is no longer interpreted as a capability, and/or raising a fault.

Particular examples will now be described with reference to the Figures.

The techniques described herein can be employed in a variety of data processing systems, and in association with different types of processing circuitry within such systems. For example the techniques can be used in association with processing circuitry taking the form of a central processing unit (CPU), but could alternatively be employed in association with other processing circuitry, such as a direct memory access (DMA) controller, an encryption accelerator, etc. Purely by way of illustrative example in the following FIG. 1, a processing pipeline of a CPU will be considered as an example of processing circuitry within which the described techniques can be used.

FIG. 1 schematically illustrates an example of a data processing apparatus 2 comprising processing circuitry including a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some example implementations. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some example implementations may support in-order processing so that instructions are issued for execution in an order corresponding to the program order in which instructions were fetched from the L1 instruction cache 20. Other example implementations may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some example implementations, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

The apparatus may be provided with capability storage elements for storing capabilities (which may be referred to as bounded pointer storage elements when the capability takes the form of a bounded pointer having associated range information indicative of an allowable range of addresses when using the pointer). Each capability/bounded pointer storage element could be a register, or a memory location in general purpose memory, for example a location on a stack memory.

As shown in FIG. 1, the apparatus 2 may have a set of bounded pointer registers 60 used as the bounded pointer storage elements. Whilst the set of bounded pointer registers is shown in FIG. 1 as being physically separate to the set of general purpose data registers 40, in one example implementation the same physical storage may be used to provide both the general purpose data registers and the bounded pointer registers.

Each bounded pointer register 60 includes a pointer value 62 that may be used to determine an address of a data value to be accessed, and constraining information specifying range constraining information 64 further specifying an allowable range of addresses when using the corresponding pointer 62. The constraining information in the bounded pointer register 60 may also include restrictions information 66 (also referred to herein as metadata which may comprise dynamic check indication metadata and/or permissions metadata) which may define one or more restrictions/permissions on the use of the pointer. For example the restriction 66 could be used to restrict the types of instructions which may use the pointer 62, or the modes of the pipeline 4 in which the pointer can be used. Hence, the range constraining information 64 and restriction information 66 may be considered to define capabilities within which the pointer 62 is allowed to be used. When an attempt is made to use a pointer 62 outside the defined capabilities, an error can be triggered. The range constraining information 64 can be useful for example for ensuring that pointers remain within certain known bounds and do not stray to other areas of the memory address space which might contain sensitive or secure information. In an example implementation where the same physical storage is used for both general purpose data registers and bounded pointer registers, then the pointer value 62 may for example be stored within the same storage location as used for a corresponding general purpose register.

FIG. 2 shows an example of types of instructions for which the allowable range is used to protect against unauthorised access to data or instructions. As shown in the top part of FIG. 2, a particular bounded pointer register PR1 includes a given pointer value 62 and range constraining information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range constraining information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range constraining information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits, but in other example implementations different sized data blocks may be used, for example 64-bit data blocks when capabilities are defined by 64 bits of information. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on implementation, but purely by way of illustration, in one example implementation if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range constraining information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

FIG. 4 schematically illustrates the representation of dynamic check information in a capability in accordance with one example implementation. As discussed in relation to FIG. 3, the capability loaded into a capability register 100 comprises a pointer value 102, range constraining (bounds) information 104, permissions information 106 and tag bit 108. The capability further comprises dynamic check information 110 which in some example configurations is represented as a single bit in the capability register 100. The permissions information 106 comprise read permission bit 112, write permission bit 114 and execute permission bit 116 indicative of whether the capability can be used for read accesses, write accesses, and execution respectively. The dynamic check information 110 determines whether or not the capability checking circuitry will determine the bounds based on the range constraining (bounds) information 104 independent of an item of state information or whether the capability checking circuitry will determine the bounds based on both the range constraining (bounds) information 104 and the item of state information.

FIGS. 5a-5d schematically illustrate data processing apparatuses comprising capability checking circuitry according to some example configurations. FIG. 5a illustrates a data processing apparatus that is provided with processing circuitry 120 and capability checking circuitry 122. The processing circuitry may for example take the form of the processing circuitry described in relation to FIG. 1. Furthermore, the capability checking circuitry 122 is illustrated as a separate circuit block from the processing circuitry 120. However, in some example configurations the capability checking circuitry could form part of the processing circuitry 120. When processing circuitry 120 encounters a memory request based on a given capability, the processing circuitry 120 passes the memory request including constraining information of the given capability to the capability checking circuitry 122. The capability checking circuitry determines whether a determined condition 124 is met. The determined condition 124 may be based on a logical condition external to the capability checking circuitry 122 and the processing circuitry 120. However, in some example configurations the determined condition 124 could be determined internally to the capability checking circuitry 122 or could be passed from the processing circuitry 120 to the capability checking circuitry 122.

When the capability checking circuitry 122 determines that the determined condition 124 is not met, the capability checking circuitry 122 determines whether the memory request falls within an allowable region of memory determined by the constraining information passed to the capability checking circuitry 122 by the processing circuitry 120. When this is the case, the capability checking circuitry 122 forwards the memory request to memory (in some implementations there may be some additional checks performed before the access to memory is allowed to proceed, for example by a memory management unit). When the capability checking circuitry 122 determines that the memory request does not fall within the allowable region the capability checking circuitry 122 signals an error.

When the capability checking circuitry 122 determines that the determined condition 124 has been met, the capability checking circuitry 122 is configured to determine whether the memory request falls within an allowable memory region that is determined based on the constraining information that was passed to the capability checking circuitry 122 by the processing circuitry 120 and based on an item of state information 126. As is the case for the determined condition 124, the item of state information 126 may be external to the processing circuitry 120 and the capability checking circuitry 122. Alternatively, the item of state information 126 may be determined within the capability checking circuitry 122 or may be passed to the capability checking circuitry 122 from the processing circuitry 120. When it is determined that the memory request falls within an allowable range that is determined based on the constraining information and the item of state information 126, the capability checking circuitry passes the memory request to memory (as mentioned earlier, in some implementations there may be some additional checks performed before the access to memory is allowed to proceed). When the capability checking circuitry 122 determines that the memory request does not fall within the allowable region the capability checking circuitry 122 signals an error.

FIG. 5b schematically illustrates a data processing apparatus comprising processing circuitry 120 and capability checking circuitry 122 in accordance with some example configurations. The processing circuitry 120 and the capability checking circuitry 122 function as described with reference to FIG. 5a with the following differences. When processing circuitry 120 encounters a memory request based on a given capability, the processing circuitry 120 passes the memory request including memory address 130 and constraining information 128 of the given capability to the capability checking circuitry 122. The capability checking circuitry 122 determines whether the determined condition is met based on dynamic checking information included in the constraining information 128. Furthermore, the item of state information is a stack pointer 132 which, in some example configurations, is one of a plurality of stack pointers each associated with a different operation mode of the processing circuitry 120. The capability checking circuitry is configured, when the determined condition is met, to determine whether the memory address 130 falls within an allowable range determined based on the constraining information 128 and the stack pointer 132, but in the absence of the determined condition being met instead determines whether the memory address 130 falls within an allowable range determined based solely on the range information contained within the constraining information 128.

FIG. 5c schematically illustrates a data processing apparatus comprising processing circuitry 120 and capability checking circuitry 122 in accordance with some example configurations. The processing circuitry and the capability checking circuitry 122 function as described with reference to FIG. 5b with the following differences. The capability checking circuitry is configured, on receipt of a memory request from processing circuitry 120 and when the dynamic check information, which is included in the constraining information 128, indicates that the capability on which the memory request is based is of the determined type, to perform a lookup in the lookup table 134 based on indexing information included in the constraining information 128. The lookup table comprises metadata and is indexed using the indexing information. When the lookup hits in the lookup table 134 the capability checking circuitry 122 determines the item of state data based on the corresponding metadata. In some example configurations the capability checking circuitry 122 also determines permissions information associated with the memory access based on the metadata retrieved from the lookup table 134. Such an approach can, for example, allow the bits normally used to indicate permissions in the capability to be repurposed to provide at least part of the indexing information required to perform the lookup in the lookup table 134.

FIG. 5d schematically illustrates a data processing apparatus comprising processing circuitry 120 and capability checking circuitry 122 as described in relation to FIG. 5a. In addition, the data processing apparatus is provided with capability generating circuitry 136 to generate capabilities based on existing capabilities. Capability generating circuitry 136, which will be described with reference to FIG. 6, receives existing capability 140 which includes a memory address (pointer value) of the existing capability 144 and constraining information 142. The constraining information comprises dynamic check indication 146 and range constraining information 148. The range constraining information encodes a first bound 150 and a second bound 152. The capability generating circuitry 136 is responsive to a capability generating instruction to generate a derived capability 160 where the constraining information 162 of the derived capability 160 is equally or more restrictive than the constraining information 142 of the existing capability 140. In particular the capability generating circuitry 136 is responsive to the capability generating instruction to generate the derived capability 160 with dynamic check indication 166 of the derived capability 160 derived from (for example set to the same value as) dynamic check indication 146 of the existing capability 140.

Furthermore, the capability generating circuitry 136 is configured to set the range constraining information 168 of the derived capability 160 to a range that is equal to or contained within the range of the range constraining information 148 of the existing capability 140. More specifically, the capability generating circuitry sets the first bound 170 of the derived capability 160 to a value that is within the range defined by the first bound 150 of the existing capability 140 and the second bound 152 of the existing capability 140, and sets the second bound 172 of the derived capability 160 to a value that is within the range defined by the first bound 150 of the existing capability 140 and the second bound 152 of the existing capability 140. In this way the capability generation circuitry 136 is able to generate derived capabilities 160 that are limited by the constraining information 142 of the existing capability 140 from which the derived capability 160 was generated.

FIG. 7 schematically illustrates a sequence of steps that are carried out by the capability checking circuitry in accordance with some example configurations. Flow begins at step S70 where it is determined if an access request has been received. If yes then flow proceeds to step S72. Alternatively, if no access request is received at step S70 then flow returns to step S70. At step S72 it is determined if the determined condition is met. If yes then flow proceeds to step S76 where the item of state information is determined. Flow then proceeds to step S78 where a range check is performed based on the range constraining information and the item of state information. Flow then proceeds to step S80. If at step S72 it was determined that the determined condition was not met then flow proceeds to step S74 where a range check is performed based on the range constraining information (i.e., independent of the item of state information). Flow then proceeds to step S80.

At step S80 it is determined whether the memory address is within a permitted region as determined based on the range check procedure. If the memory address is not within the permitted region then flow proceeds to step S86 where an error is triggered. If at step S82 the memory address is determined to be within the permitted region then flow proceeds to step S82 where it is determined whether all other constraints associated with the memory access are met (for example whether the memory access is of a permitted type having regard to the permission bits of the capability). If yes then flow proceeds to step S84 where the memory access is allowed. If however at step S82 it is determined that the other constraints are not met then flow proceeds to step S86 where an error is triggered.

FIG. 8 schematically illustrates a sequence of steps carried out by the capability generation circuitry. Flow begins at step S88 where it is determined whether an instruction to generate a new capability based on an existing capability has been received. If no then flow remains at step S88. If at step S88 it is determined that an instruction to generate a new capability based on an existing capability has been received then flow proceeds to step S90. At step S90 it is determined whether the existing capability is of a specified type. The specified type can take a variety of forms, but in one example the specified type of capability is a stack pointer capability, and capabilities derived from a stack pointer capability are capabilities for which the above-described dynamic check process should be performed.

If the existing capability is not of the specified type, then flow proceeds to step S100 where a new capability is generated with bounds (range constraining information) that is within the range of the bounds (range constraining information) of the existing capability. Flow then proceeds to step S102 where the permissions of the derived capability are set as either a same set of permissions as the existing capability or a more limited (restrictive) set of permissions than the existing capability. If at step S90 it was determined that the existing capability is of the specified type then flow instead proceeds to step S92. At step S92 the capability generating circuitry sets a bit (dynamic check indication) to indicate that the new capability is derived from a capability of the specified type (this in due course triggering the above-described dynamic check process when the derived capability is used to generate a memory access). Flow then proceeds to step S94 where the bounds (range constraining information) of the new capability is generated that is within the range of the bounds (range constraining information) of the existing capability. Flow then proceeds to step S96 where the permissions of the derived capability are set as either a same set of permissions as the existing capability or a more limited (restrictive) set of permissions than the existing capability. Flow then proceeds to step S98 where capability indication metadata is generated, the capability indication metadata being indicative of a capability that provides the item of state information for memory accesses that are based on the generated capability. In step S98 the capability indication metadata can be optionally generated by repurposing permission bits of the generated capability.

FIG. 9 schematically illustrates regions of memory defined based on a range check operation carried out by the capability checking circuitry in accordance with some example configurations. The capability checking circuitry receives a memory request based on a given capability 180 comprising constraining information 182 and a memory address 184. The constraining information 182 comprises range constraining information 186 which encodes a first bound 188 and a second bound 190. In the illustrated example configuration the given capability 180 is initially allocated (left hand subfigure) based on an allocated stack region 198 defined based on a stack pointer value (SP) 192. The allocated stack region 198 comprises a region of memory between the first bound 188 and the second bound 190 which are encoded, as part of the initial allocation of the given capability 180, into the range constraining information 186 which forms part of the constraining information 182.

Whilst the stack pointer value 192 remains the same as it was during the initial allocation, memory accesses based on the given capability are permitted when the memory address falls within the allocated stack region 198. If subsequent to the initial allocation the stack pointer is modified (as illustrated in the middle subfigure) to provide stack pointer value 194 then the allocated stack region is increased to comprise the region between first bound 188 and stack pointer value 194. However, memory accesses based on the given capability 180 are constrained by the first bound and the more restrictive of the second bound 190 and the stack pointer value 194. Hence, memory accesses which are based on the given capability 180 are only permitted (when the stack pointer takes stack pointer value 194) when the memory address 184 falls within the memory region 200.

As illustrated in the subfigure on the right hand side of FIG. 9, if the stack pointer value 192 is updated to the stack pointer value 196 then the allocated stack region 202 is reduced from the initially allocated stack region 198. Memory accesses based on the given capability 180 are permitted if they are bounded by the first bound and the more restrictive of the second bound 190 and the stack pointer value 196. In the illustrated example configuration memory accesses are permitted if they fall within the memory region 202 but are denied if they fall within the memory region 204 even though the range constraining information 186 indicates that this memory region is permitted. Hence the stack pointer value 196 provides an additional bound on the memory region 202 that is accessible to memory accesses generated based on the given capability 180.

FIG. 10 schematically illustrates various operating modes in which the processing circuitry can operate according to some example configurations. As shown in FIG. 10, the processing circuitry may be arranged to operate in a secure mode and a less secure mode. In addition, or alternatively, the processing circuitry may be arranged to execute program code in a privileged mode or an unprivileged mode. The levels of privilege and the different security modes can be viewed as being orthogonal levels of trust, and a different mode level of trust of the processing circuitry may be associated with each combination of secure/less secure domain and privileged/unprivileged mode. Hence, as shown in FIG. 10, there may be four different operating modes in the example shown.

The processing circuitry is configured to define a region of memory that operates as a stack with a corresponding stack pointer for each of the operating modes. As each stack represents a different region of the total memory space, capabilities derived based on a region of memory operating as a stack in one of the modes should only be used for memory accesses constrained by the corresponding stack pointer when operating in the that mode. A capability defined in a first mode based on a first stack pointer associated with the first mode should only be able to generate memory accesses with reference to the first stack pointer when in the first mode. Hence, in some example configurations the capabilities of the determined type encode capability indication metadata indicative of the stack pointer from which the given capability has been derived.

FIG. 11 schematically illustrates one way of encoding dynamic check information and capability indication metadata into capabilities that are generated based on stack pointers in each of the four modes discussed in relation to FIG. 10. Each capability comprises read (R), write (W) and execute (X) permission bits, and dynamic check indication (D). The capabilities are further provided with range constraining information and a pointer value. In a first example usage case, capability 210 functions as a capability that is constrained, by the range constraining information, in terms of the memory address range accessible by the pointer value. The dynamic check indication (D) of capability 210 is clear (logical zero) indicating that the capability is not of the determined type. It would be readily apparent to the person skilled in the art that a logical one or set value could instead be used to indicate that the capability 210 is not of the determined type. As the capability 210 is not of the determined type, the permission bits (R, W and X) can take logical values of one or zero indicative as to whether the capability can be used to perform read, write or execute memory accesses.

In a second example usage case, capability 220 functions as a capability that is constrained, by the range constraining information, in terms of the memory address range accessible by the pointer value. The dynamic check indication of capability 220 is set to indicate that the capability is further constrained by a further capability of the specified type, which in this case is a stack pointer capability. The read and execute permissions bits are repurposed to indicate which stack pointer of the four stack pointers is to provide the item of state information. In this case the read bit is set to zero and the execute bit is set to zero indicating that the item of state information is to be provided by (derived from) a stack pointer in the less secure unprivileged mode. The write permission bit is retained as a permission bit and takes a value of logical one or logical zero dependent on whether write accesses are to be used for the capability 220. The remaining permissions for capability 220 can either be inferred (for example, as readable and non-executable) or determined from the stack pointer capability in the less secure unprivileged mode.

In a third example usage case, capability 230 functions as a capability that is constrained, by the range constraining information, in terms of the memory address range accessible by the pointer value. The dynamic check indication of capability 230 is set to indicate that the capability is further constrained by a further capability of the specified type, which in this case is a stack pointer. The read and execute permissions bits are repurposed to indicate which stack pointer of the four stack pointers is to provide the item of state information. In this case the read bit is set to zero and the execute bit is set to one indicating that the item of state information is to be provided by (derived from) a stack pointer in the more secure unprivileged mode. The write permission bit is retained as a permission bit and takes a value of logical one or logical zero dependent on whether write accesses are to be used for the capability 230. The remaining permissions for capability 230 can either be inferred (for example, as readable and non-executable) or determined from the stack pointer capability in the more secure unprivileged mode.

In a fourth example usage case, capability 240 functions as a capability that is constrained, by the range constraining information, in terms of the memory address range accessible by the pointer value. The dynamic check indication of capability 240 is set to indicate that the capability is further constrained by a further capability of the specified type, which in this case is a stack pointer. The read and execute permissions bits are repurposed to indicate which stack pointer of the four stack pointers is to provide the item of state information. In this case the read bit is set to one and the execute bit is set to zero indicating that the item of state information is to be provided by (derived from) a stack pointer in the less secure privileged mode. The write permission bit is retained as a permission bit and takes a value of logical one or logical zero dependent on whether write accesses are to be used for the capability 240. The remaining permissions for capability 240 can either be inferred (for example, as readable and non-executable) or determined from the stack pointer capability in the less secure privileged mode.

In a fifth example usage case, capability 250 functions as a capability that is constrained, by the range constraining information, in terms of the memory address range accessible by the pointer value. The dynamic check indication of capability 250 is set to indicate that the capability is further constrained by a further capability of the specified type, which in this case is a stack pointer. The read and execute permissions bits are repurposed to indicate which stack pointer of the four stack pointers is to provide the item of state information. In this case the read bit is set to one and the execute bit is set to one indicating that the item of state information is to be provided by (derived from) a stack pointer in the more secure privileged mode. The write permission bit is retained as a permission bit and takes a value of logical one or logical zero dependent on whether write accesses are to be used for the capability 250. The remaining permissions for capability 250 can either be inferred (for example, as readable and non-executable) or determined from the stack pointer capability in the more secure privileged mode.

The particular encoding used to determine the stack pointer can be provided using one of the two bits (R or X) to indicate the privilege mode and the other to indicate whether the stack pointer capability that is being referenced is the more secure or the less secure stack pointer capability. Alternative encodings would be readily apparent to the person skilled in the art.

FIG. 12 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically a simulator implementation may run on a host processor 515, optionally running a host operating system 510, supporting the simulator program 505. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 50 in the hardware apparatus 2 could be emulated as a simulated address space which is mapped on to the virtual address space used by the host operating system 510 by the simulator 505. In arrangements where one or more of the hardware elements referenced in the previously described examples are present on the host hardware (for example host processor 515), some simulated implementations may make use of the host hardware, where suitable.

The simulator program 505 may be stored on a computer readable storage medium (which may be a non-transitory medium), and provides a virtual hardware interface (instruction execution environment) to the target code 500 (which may include applications, operating systems and a hypervisor) which is the same as the hardware interface of the hardware architecture being modelled by the simulator program 505. Thus, the program instructions of the target code 500 may be executed from within the instruction execution environment using the simulator program 505, so that a host computer 515 which does not actually have the hardware features of the apparatus 2 discussed above can emulate those features. The simulator program may include processing program logic 520 to emulate the behaviour of the processing circuitry 120 and capability checking program logic 522 to emulate the behaviour of the capability checking circuitry 122 apparatus of FIGS. 5a-5d. In addition, the simulator program may include processing program logic to emulate the behaviour of the additional features described in relation to any of 5a to 5d. Hence, the techniques described herein for constraining access to memory using capabilities can in the example of FIG. 12 be performed in software by the simulator program 505.

In brief overall summary there is provided an apparatus, method and computer program for constraining memory accesses. The apparatus comprises processing circuitry to perform operations during which access requests to memory are generated. The processing circuitry is arranged to generate memory addresses for the access requests using capabilities that identify constraining information. The apparatus further comprises capability checking circuitry to perform a capability check operation to determine whether a given access request whose memory address is generated using a given capability is permitted based on given constraining information identified by the given capability. The capability check operation includes performing a range check based on range constraining information provided by the given constraining information, and when a determined condition is met, to perform the range check in dependence on both the range constraining information and an item of state information of the apparatus which varies dynamically during performance of the operations of the processing circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry configured to perform operations during which access requests to memory are generated, wherein the processing circuitry is arranged to generate memory addresses for the access requests using capabilities that identify constraining information; and capability checking circuitry configured to perform a capability check operation to determine whether a given access request whose memory address is generated using a given capability is permitted based on given constraining information identified by the given capability, the capability check operation including performing a range check based on range constraining information provided by the given constraining information;

wherein:
the capability checking circuitry is further configured, when a determined condition is met, to perform the range check in dependence on both the range constraining information and an item of state information of the apparatus which varies dynamically during performance of the operations of the processing circuitry;
the item of state information is a pointer value that points to a location within a region of memory; and
the capability checking circuitry is further configured, when the determined condition is met, to perform the range check based on a first bound derived from the range constraining information and a second bound derived from whichever of the range constraining information and the pointer value results in the second bound being more restrictive.

2. The apparatus of claim 1, wherein the pointer value is a stack pointer value and the region of memory is configured to be used as a stack.

3. The apparatus of claim 1, wherein the capability checking circuitry is further configured to permit the memory access when the memory address is within an allowable region of memory bounded between the first bound and the second bound.

4. The apparatus of claim 1, wherein the capability checking circuitry is configured to determine that the determined condition is met when the given capability is of a determined type.

5. The apparatus of claim 4, wherein the given constraining information of the given capability comprises dynamic check indication metadata to indicate whether the given capability is of the determined type.

6. The apparatus of claim 5, wherein the dynamic check indication metadata comprises a dedicated metadata field within the given capability.

7. The apparatus of claim 4, wherein the given capability is of the determined type when the given capability references a further capability of a specified type.

8. The apparatus of claim 7, wherein:
the given constraining information is arranged to provide capability indication metadata to identify the further capability; and
the further capability is arranged to provide an associated pointer value and associated constraining information, and the associated pointer value forming the item of state information.

9. The apparatus of claim 8 wherein:
the further capability is a stack pointer capability;
the processing circuitry has multiple operating modes each having a corresponding associated stack in memory with a corresponding stack pointer capability; and
the capability indication metadata is arranged to provide stack pointer indication metadata to identify which corresponding stack pointer capability forms the item of state information.

10. The apparatus of claim 8, wherein:
the constraining information of each capability comprises a first subset of permission bits and a second subset of permission bits; and
when the given capability is of the determined type, the first subset of permission bits are repurposed to provide the capability indication metadata.

11. The apparatus of claim 10, wherein the capability checking circuitry is configured, when the given capability is of the determined type, to determine permissions of the given capability from the second subset of permission bits and a set of inferred first permission bits.

12. The apparatus as claimed in claim 11, wherein the set of inferred first permission bits are determined by values of equivalent permission bits provided by the further capability of the specified type.

13. The apparatus of claim 10, wherein the first subset of permission bits comprises a read permission bit indicating whether a given pointer value provided by the given capability is allowed to be used to generate a memory address for a data item to be read, and an execute permission bit indicating whether the given pointer value provided by the given capability is allowed to be used to generate a memory address for an instruction to be fetched for execution by the processing circuitry.

14. The apparatus of claim 7, wherein:
the constraining information of the further capability of the specified type comprises dynamic check indication metadata set to indicate that that further capability is of the determined type;
the apparatus further comprises capability generation circuitry to generate derived capabilities from existing capabilities; and
the capability generation circuitry is arranged, when a derived capability is generated from the further capability, to cause the dynamic check indication metadata for that derived capability to be inherited from the further capability.

15. The apparatus of claim 7, further comprising:
capability generation circuitry to generate derived capabilities from existing capabilities; and
the capability generation circuitry is arranged, when a derived capability is generated, to cause that derived capability to have dynamic check indication metadata set in dependence on whether that derived capability is derived from the further capability of the specified type.

16. The apparatus of claim 1, wherein the capability checking circuitry is configured to, when the determined condition is met, perform a lookup, based on the given constraining information, in a lookup table associating a subset of capabilities with metadata and, when the lookup hits in the lookup table, to determine the item of state information based on the metadata.

17. A method comprising:
employing processing circuitry to generate, during operations, memory addresses for access requests to memory using capabilities that identify constraining information;
employing capability checking circuitry to perform a capability check operation to determine whether a given access request whose memory address is generated using a given capability is permitted based on given constraining information identified by the given capability, the capability check operation including performing a range check based on range constraining information provided by the given constraining information; and
when a determined condition is met, arranging the capability checking circuitry to perform the range check in dependence on both the range constraining information and an item of state information of the apparatus which varies dynamically during performance of the operations of the processing circuitry,
wherein:
the item of state information is a pointer value that points to a location within a region of memory; and when the determined condition is met, the range check is performed based on a first bound derived from the range constraining information and a second bound derived from whichever of the range constraining information and the pointer value results in the second bound being more restrictive.

18. A computer program for controlling a host data processing apparatus to provide an instruction execution environment, comprising:

processing program logic to perform operations during which access requests to memory are generated, wherein the processing program logic is arranged to generate memory addresses for the access requests using capabilities that identify constraining information; and capability checking program logic to perform a capability check operation to determine whether a given access request whose memory address is generated using a given capability is permitted based on given constraining information identified by the given capability, the capability check operation including performing a range check based on range constraining information provided by the given constraining information; wherein:

the capability checking program logic is further configured, when a determined condition is met, to perform the range check in dependence on both the range constraining information and an item of state information of the apparatus which varies dynamically during performance of the operations of the processing program logic;

the item of state information is a pointer value that points to a location within a region of memory; and the capability checking program logic is further configured, when the determined condition is met, to perform the range check based on a first bound derived from the range constraining information and a second bound derived from whichever of the range constraining information and the pointer value results in the second bound being more restrictive.

* * * * *